United States Patent [19]

Higgins

[11] Patent Number: 4,765,569
[45] Date of Patent: Aug. 23, 1988

[54] PASSENGER SAFETY DEVICE FOR HIGH SPEED VEHICLES

[76] Inventor: Joseph M. Higgins, 1549 Hampton, Grosse Pointe Woods, Mich. 48236

[21] Appl. No.: 34,911

[22] Filed: Apr. 6, 1987

[51] Int. Cl.$^4$ .............................................. B64D 25/02
[52] U.S. Cl. ................................. 244/118.5; 244/121; 244/122 R; 280/741
[58] Field of Search ................ 244/121, 118.5, 122 R; 280/741, 742, 738, 739

[56] References Cited

U.S. PATENT DOCUMENTS

| | | | |
|---|---|---|---|
| 2,834,609 | 5/1958 | Bertrand | 280/739 |
| 2,899,214 | 8/1959 | D'Antini | 280/741 |
| 3,243,822 | 4/1966 | Lipkin | 244/121 |
| 3,261,576 | 7/1966 | Kalyi | 244/209 |
| 3,370,886 | 2/1968 | Frost | 244/121 |
| 3,603,535 | 9/1971 | De Polo | 244/121 |

Primary Examiner—Galen Barefoot
Attorney, Agent, or Firm—Gifford, Groh, VanOphem, Sheridan, Sprinkle and Dolgorukov

[57] ABSTRACT

The specification discloses a passive restraint system for high speed vehicles utilizing inflatable bags placed in the backs of the seats of the vehicle. The bags are connected by headers to a manifold which communicates with the exterior of the vehicle and, when open, allows air at high speed to enter and inflate the bags. A relief valve is provided in the cabin to open moments before the bags inflate to remove any danger of pressure shock from the rapid inflation of the bags and to, in some cases, aid in the inflation thereof. In some applications, an optional compressed air and/or compressed gas supply is also disclosed.

24 Claims, 2 Drawing Sheets

PASSENGER SAFETY DEVICE FOR HIGH SPEED VEHICLES

BACKGROUND OF THE INVENTION

1. Field of The Invention

The present invention relates to a passenger safety device for vehicles, and more particularly to a passive restraint for passengers in high speed vehicles which is operable in many embodiments by utilizing the "Ram" effect of outside air entering the vehicle at high speeds to inflate a passive restraint device such as an air bag.

2. Description of The Prior Art

Work has been going on in the transportation industry for many years to devise a suitable passive restraint system to protect passengers in situations of rapid stops or crashes of the vehicles they are riding in. In recent years, attention has centered around inflatable restraints, such as the air bag, as one of the most suitable passive restraint devices, as it is kept completely out of the way of the passenger during operation of the vehicle, and thus, is even more convenient than devices such as automotive seat belts, etc. Because of the focus of attention on air bags as one of the main passive restraint devices being looked at, and because of the heavy weight of the gas cylinders which are needed to inflate air bags rapidly in crash situations, such air bags have only been looked at in connection with ground based passenger type vehicles such as cars, trucks and buses, etc., and relatively little work has gone in to the providing of air bags for higher speed vehicles such as "bullet trains" and aircraft. It is believed that the application of inflatable bags for "bullet trains", aircraft and other high speed vehicles has been over looked for two primary reasons. First, again, is the weight of the compressed gases which must be carried with the air bag, and secondly, is the failure to realize that the ram effect of the air at high speeds can be used as the major force behind inflation of the air bags in such vehicles, thus eliminating the problem of weight in many instances.

In determining whether or not to proceed with a patent application of my invention, I caused a search to be made of the records of the U.S. Patent Office and located the following patents:

| PATENTEE | U.S. Pat. No. | YEAR |
| --- | --- | --- |
| Ben A. Stewart | 3,909,037 | 09/75 |
| Bernard M. Pech | 3,929,350 | 12/75 |
| David P. Hass | 3,624,810 | 11/71 |
| Hattori Et al. | 4,043,572 | 08/77 |
| Per O. Weman | 4,126,325 | 11/78 |
| Per O. Weman | 3,994,506 | 11/76 |
| O. W. Boblitz | 3,351,381 | 08/66 |

A study of these patents shows that none of them have considered the use of the ram effect of outside air traveling at high speed to inflate the bags, and further, the study of these patents revealed that pressure shock inside the passenger compartment of motor vehicles is a serious problem in the art, and made apparent the benefits of utilizing lower pressure outside atmosphere for pressure relief, as will be described concerning my invention.

Thus, my invention solves several long standing problems in the art, that of the weight associated with passive restraints such as air bags, the pressure shock connected with their use, and the problem of how to provide a passive restraint system for high speed vehicles.

SUMMARY OF THE INVENTION

The present invention solves the aforementioned problems of how to provide a passive restraint system for a high speed vehicles by providing a manifold communicating both with the interior and the exterior of said high speed vehicle. To the manifolds are connected several headers which communicate with strategically placed inflatable bags in the backs of the seats provided in the passenger carrying vehicle. There is also provided a pressure relief valve communicating with the exterior of the vehicle, and appropriate means are provided to open said pressure relief valve moments before opening said manifold, so that the effect of the air rapidly inflating the bags through the manifold and headers will not only be relieved by the pressure relief valve, but if the vehicle is such as an aircraft, the inflation of the air bags may actually be aided by a reduction in pressure within the cabin to the degree permitted by the equipment.

Thus, it is one of the objects of the present invention to provide a passive restraint system utilization in all types of high speed vehicles such as aircraft, bullet trains, and any other type of high speed vehicle wherein the speed of the vehicle is sufficient in a potential crash situation to make the ram air effect of air entering the vehicle of substantial assistance in inflating an air bag.

It is a further object of the present invention to provide a passive restraint system of the foregoing nature which may be either automatically activated under a crash situation, or activated by the operating personnel of the vehicle in which the system is installed.

A further object of the present invention is to provide a passive restraint system which will not have a pressure shock connected therewith when the air bags utilized in the system inflate.

A further object of the present invention is to provide a passive restraint system which is much lighter than systems heretofore available.

A still further object of the present invention is to make a passive restraint system for high speed vehicles which is relatively inexpensive to manufacture.

A still further object of the present invention is to provide, in those embodiments used in aircratf, extensive additional buoyancy where a crash accurs over water.

A still further object of the present invention is to provide a passive restraint system for high speed passenger vehicles which is relatively simple and reliable in construction and operation.

Further objects and advantages of this invention will be apparent from the following description and appended claims, reference being had to the accompanying drawings forming a part of this specification, wherein like characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims.

Also, it is to be understood that the phraseology and terminology employed herein is for the purposes of description, and not of limitation.

DESCRIPTION OF THE PREFERRED EMBODIMENT

While this invention applies to all high speed vehicles which carry passengers, such as aircraft, bullet trains, and other high speed above ground vehicles, a description of the invention as applied to aircraft will most easily illustrate the advantages of the present invention over the prior art.

Most aircraft crashes take place on take off or in landing. In the majority of crashes impact is the cause of most deaths, not fire. This is because as the plane crashes, the wings are often torn off by obstructions such as trees, poles, buildings, etc. This removes the fuel tanks as well as the wings so that any fire usually takes place behind the cabin. The cabin rockets ahead and upon final impact, the seats within the cabin are torn loose. The seats "fire" like "bullets" within a "gun barrel" cabin. The air or gas bags of the present invention are designed to prevent the seats and passengers from becoming deadly bullets. In most crash situations pilots do have time, perhaps 15 to 60 seconds, to activate a restraint system to protect the passengers and crew. The present invention allows those pilots the life saving systems they need in those last precious seconds before impact.

Figure 1:
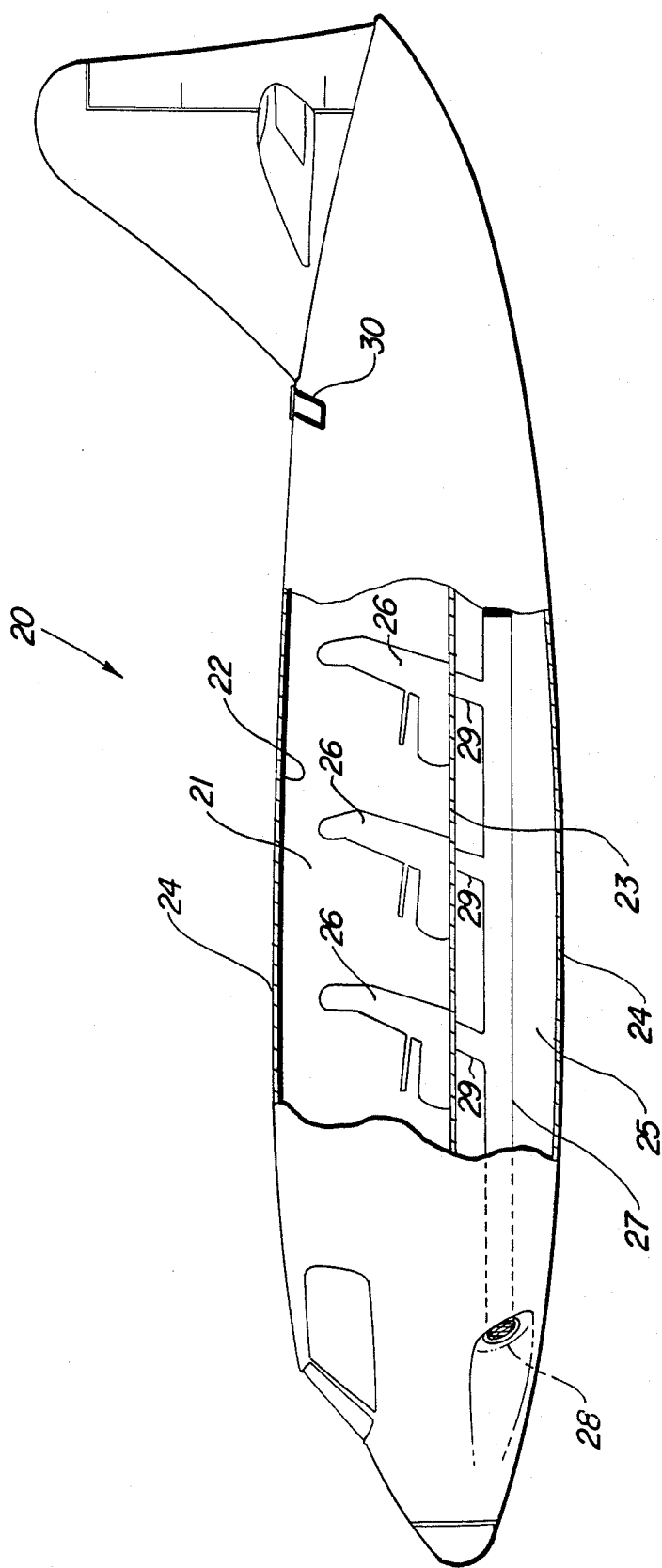
FIG. 1 is an elevational, diagrammatic view, partially cut away, showing a construction embodying my invention installed in an air craft.

Referring now to FIG. 1, there is shown an elevational view, partly cut away, of my invention as installed in an aircraft. The aircraft, generally designated by the numeral 20, has a passenger carrying cabin 21 defined by a ceiling 22 and a floor 23. Underneath the floor 23, and between the floor and the exterior 24 of the aircraft is a bulkhead space 25. A plurality of seats 26 are mounted to the floor 23 by means well known in the art. A manifold 27 having an inlet(s) 28 communicating with the exterior 24 of the aircraft, preferably near the front thereof, is provided in the bulkhead space 25. A seat header 29 connects each seat 26 with the manifold 27. An exhaust relief scoop(s) 30, which will be described in more detail hereinafter is provided near the rear of the cabin 21.

Figure 2:
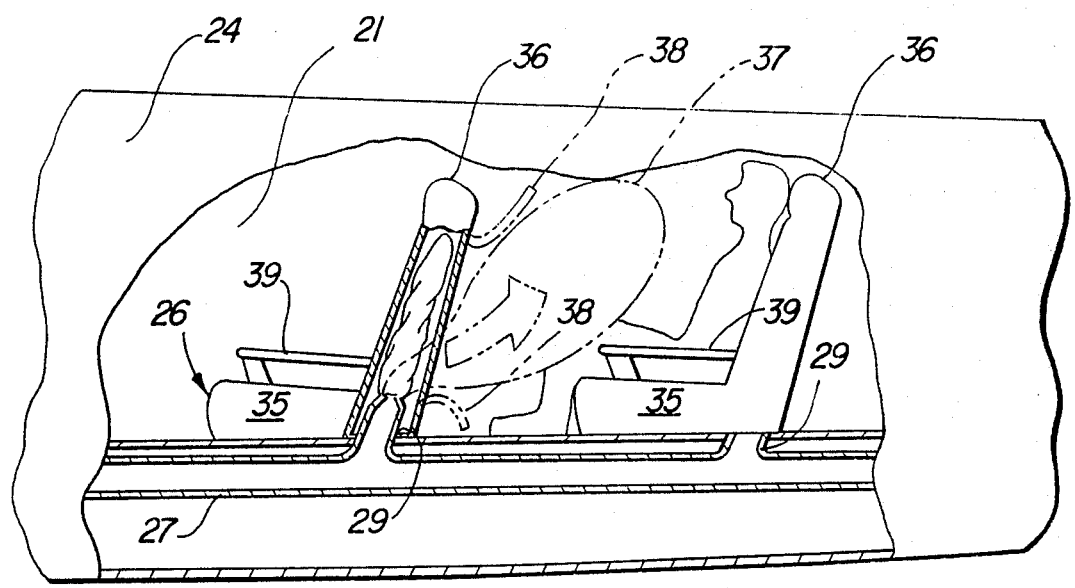
FIG. 2 is a diagrammatic view showing how the air bag used in one embodiment of my construction will inflate to protect a passenger in a crash situation.

As more particularly shown in FIG. 2, each of the seats, generally designated by the numeral 26, has a cushion portion 35, and a seat back portion 36, which may also double as a flotation device. In the present invention, the seat backs 36 are hollow to contain an expandable air bag 37. The air bag 37 is mounted to the seat header 29. As shown by the phantom lines, when the air bag expands, the seat back 38, in ways well known in the art, is pushed away to allow expansion of the air bag. The seats 26 are also provided with an arm rest 39.

Figure 3:
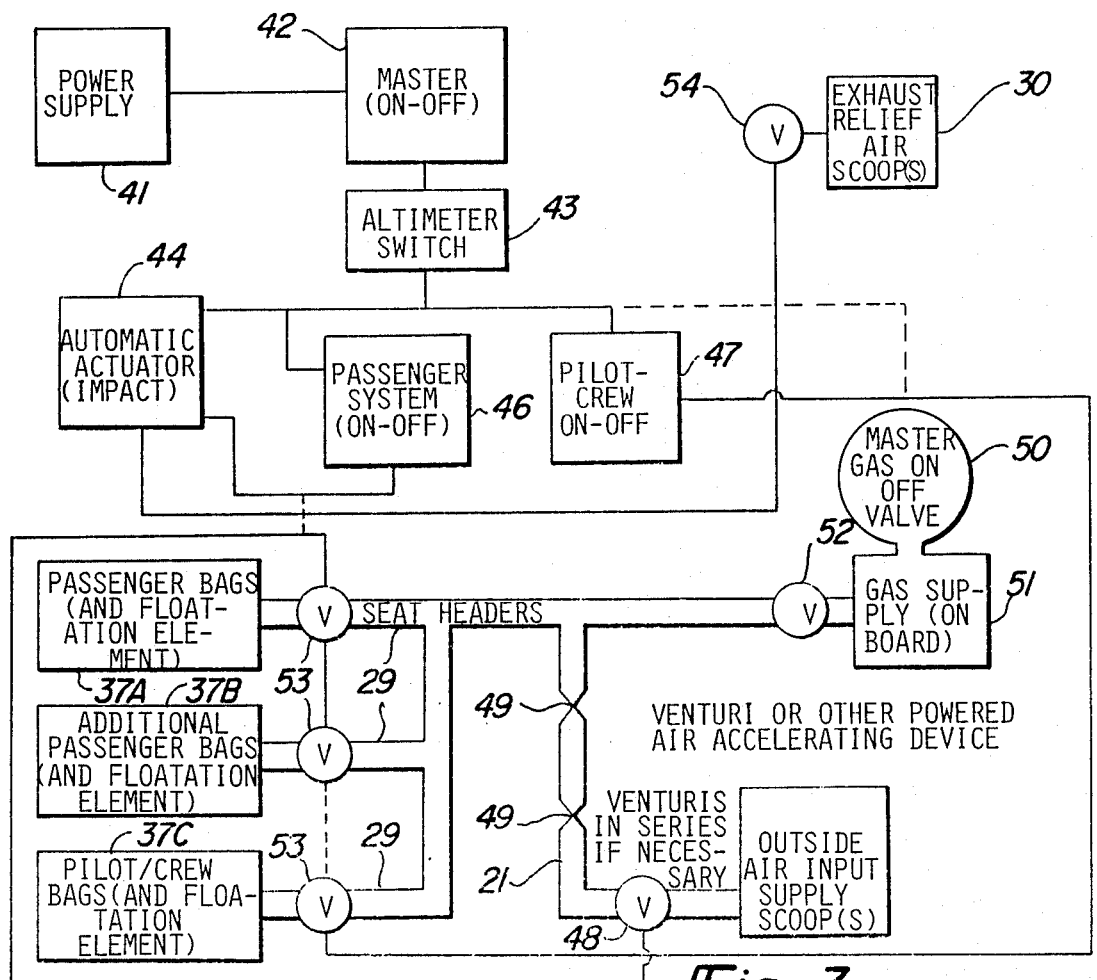
FIG. 3 is a schematic view of a construction embodying the present invention.

Referring now to FIG. 3, a diagrammatic view of my system is shown. A power supply 41 of any practicable type is provided, and is controlled by a master on/off switch 42 which would be mounted on the pilots console. In order to prevent deployment of my invention above a predetermined altitude, an altimeter switch 43 may be provided. These switches are well known in the art and the particular switch which would be chosen would be determined by the type of craft my system was mounted in. If my invention was mounted in a high speed train for example, the altimeter switch may not be needed at all. The altitude above which the system should not deploy may vary in aircraft, depending whether the aircraft is a small aircraft or a large aircraft, for example.

In any event, the power supply 41 is connected through the master on/off switch 42, and the altimeter switch 43, to an automatic actuator 44, a passenger system on/off switch 46, and a pilot crew on/off switch 47. The use of the system under what is anticipated to be normal conditions, i.e., those in which the pilot or another member of the crew would have time before impact to activate the system will be first described, and then the operation of the system with the automatic actuator 44 will be described.

Depending upon the type of vehicle my system is installed in, the system may utilize the ram air effect of air entering the vehicle at high speeds by itself, or it may have assistance with an optional gas supply, or may operate solely on the gas supply. If only the outside air supply is used, the outside air input supply scoop(s), which may form the inlet 28, are shown, as before, connected to the manifold 27. An inlet valve 48 is provided, preferably just down stream of the inlet 28. Depending upon the particular application to which my invention is to be put, and the particular craft it is to be installed in, it may be desired to enhance the ram effect of the air entering the inlet 28 by providing one or more venturis 49 downstream of the inlet valve. If an optional gas supply is used, it would be connected by a conduit to the manifold 27 through a gas supply valve 22. A plurality of seat headers 29 are connected to the manifold 27 downstream of the inlet valve 48, and the gas supply valve 52. Each of the air bags 37 contained in the seat backs 36 is connected to one of the seat headers 29. If desired, a header valve can be interposed between the air bag 37 and the header 29, although this valve is optional, and is not anticipated to be needed in many situations.

It is noted that the bags 37 are denoted as being of three separate types, and are labelled 37a, 37b, 37c respectively. Although the bags are identical, depending upon the particular application to which my invention is put, they may be activated in different manners. The passenger air bags 37a are denoted as air bags even though they may be operated by a combination of air and gas, or air alone, or gas alone. These air bags are those found in the seat backs 36 of the passenger seats 26.

The additional passenger air bags, denoted 37b, may be placed in various places around the aircraft 21 at crew stations etc., such as are provided for the stewardesses. Regardless of how they are mounted, they would be operated in the same way, and at the same time as the passenger air bags and flotation elements 37a are operated. The pilot/crew air bags and flotation elements 37c are those which would be found in the pilots cockpit, and would be designed to be operated moments later than the passenger air bags 37a, and additional passenger air bags 37b so that the pilot and crew would have control of the air or other craft until the last possible moment.

In operation, upon a crash becoming imminent, the pilot would operate the passenger system on/off switch 46 which was already receiving power from the power supply 41 through the master on/off switch 42 and the altimeter switch 43. Regardless of the features of any particular application of my system, the first thing that would be activated would be the relief valve 54, which would then operate the exhaust relief air scoop(s) 30, which was previously described as being mounted in the rear of the cabin 21. This is a particularly important feature of my invention, which, although optional, is believed to be necessary in many embodiments thereof.

The opening of the exhaust relief air scoop(s) moments before the inflation of the air bags does two things in my system. First, it eliminates a problem commonly found in air bags used in such types of vehicles as passenger automobiles. Since those systems use compressed gases exclusively, the inflation of the air bag is almost instantaneous, and the shock wave that can be sent through a closed passenger compartment by the rapid inflation of an air bag can be physically very damaging. Much of the work going on in the field of passenger air bags has been dealing with how to alleviate this shock wave. In my invention, by opening an appropriately sized exhaust relief air scoop(s) moments before the air bags 37 are inflated, air is free to escape out the rear of the cabin, and this problem is eliminated.

A second benefit of having this exhaust relief air scoop(s) becomes particularly apparent in air craft and other high speed vehicles. Because of the rapid forward movement of the vehicle, and the placement of the exhaust relief scoop(s) 30 toward the rear of the vehicle, where a vacuum is likely to be created, not only is the pressure shock then relieved, but the slight vacuum which is created helps expand the air bag, thus making the gas supply optional in many cases. Of course it must be understood that the size of the exhaust relief air scoop(s) 30 must be appropriately sized and located so that a rapid decompression would not occur. Only a slight vacuum before the activation of the air bags 37 is desired to alleviate the pressure shock problem, and to aid in the inflation of the air bags.

Once the exhaust relief air scoop(s) 30 has been operated by the exhaust relief valve 54, power would then be supplied from the passenger on/off switch to the inlet valve 48, and to the gas supply valve 52, if an optional gas supply 50 was present. The air entering the manifold 27 through the inlet 28 would pass through the venturis 49, if these are provided, and combine with the gas from the optional gas supply 50 (if provided) before entering the seat headers 29. If used, the header valves 53 would have been also opened by the passenger system on/off switch 46, and would connect the passenger air and flotation elements 37a, and the additional passenger air bags and flotation elements 37b to the air inlet 28 and gas supply 50 and inflate these. This would all happen in a matter of seconds, and once seeing this system operating satisfactorily, the pilot, immediately before impact, would operate the pilot crew on/off switch 47 which would open the header valve 53 attached to the pilot/crew air bags 37c, and thus protect the crew on impact.

While it is desirable to have the crew operate the passenger system on/off switch 46 and the pilot crew on/off switch 47 manually, it is, of course, realized that events may happen so quickly that the crew is unable to do this, and that some device must be provided to immediately inflate all of the air bags 37a, 37b, 37c upon impact if the system has not been activated by the crew. Thus, also connected to the power supply 41 through the master on/off switch 42 and the altimeter switch 43, is an automatic impact actuator 44 designed to operate on impact of the craft. This system has the necessary devices to send the power to the exhaust relief valve 54, the inlet valve 48, and the optional gas supply valve 51 in the proper sequence to operate the system in the manner just described. It also has the necessary means, well known in the art, to operate the header valves 53 if these are provided, and the only difference in operation when the system is operated upon impact is that the pilot/crew air bags 37c will be inflated at the same time as the passenger and additional passenger air bags, 37a and 37b, are being activated, because, presumably, the situation is serious enough at that point that the pilot and crew need protection at the same time the passengers do. Of course, it can be seen that, depending upon the particular application, and placement of the air bags, any practicable sequence of operating the inflatable air bags 37 can be used by making the necessary changes to the connections of the automatic actuator 44, the passenger system on/off switch 46, and the pilot crew on/off switch 47.

Thus, by utilizing in a heretofore unknown fashion, the ram air effect of air traveling into the past high speed passenger vehicles, and combining the use of that effect with an exhaust relief air scoop(s) to alleviate the problems resulting from the use of such effect, a novel restraint system for high speed passenger craft is provided.

I claim:

1. A safety device for occupants of vehicles, including:
   (a) inflatable means for protecting the occupants of said vehicle,
   (b) means to utilize outside air entering said vehicle connected to said inflatable means, wherein said means to utilize include:
      i. a manifold communicating with the exterior of said vehicle and said inflatable means, at least one exhaust relief air scoop communicating between the exterior of said vehicle and the interior of said vehicle; and
   (c) means to control connected to said means to utilize.

2. The device defined in claim 1, wherein said means to utilize further includes at least one seat header interposed between said manifold and said inflatable means.

3. The device defined in claim 2, wherein said inflatable means include at least one inflatable air bag connected to said seat header.

4. The device defined in claim 3, and further including:
   (a) an exhaust relief valve connected to said exhaust relief air scoops and operated by said means to control,
   (b) an inlet valve positioned downstream of said inlet and operated by said means to control.

5. The device defined in claim 4, and including at least one venturi interposed in said manifold between said inlet valve and seat header.

6. The device defined in claim 5, and further including a header valve interposed between each of said seat headers and its said corresponding inflatable air bag and connected to said means to control.

7. The device defined in claim 6, and further including:
   (a) a compressed gas supply connected to said manifold, and (b) a gas supply valve interposed between said gas supply and said manifold and operated by said means to control.

8. The device defined in claim 7, wherein said inflatable means include passenger air bags and pilot crew air bags.

9. The device defined in claim 8, wherein said means to control include:
   (a) a power supply,
   (b) a master on/off switch connected to said power switch, and;
   (c) an altitude operated switch connected to said master on/off switch.

10. The device defined in claim 9, wherein said means to control further include:
    (a) a passenger system on/off switch connected at its input to said altitude operated switch, and at its output to said inlet valve, said header valve and said gas supply valve.

11. The device defined in claim 10, wherein said means to control further include a pilot-crew on/off switch connected at its input to said altitude operated switch, and at its output to a pilot/crew header valve.

12. The device defined in claim 11, wherein said means to control further include:
    (a) an automatic system actuator operable upon impact connected to said altitude operated switch, said inlet valve, said gas supply valve, said passenger header valve, and said pilot/crew header valve to operate said valves to first open said exhaust relief scoops, next open said manifold inlet, next connect said gas supply to said manifold, and then operate said header valves to inflate said passenger and said pilot/crew air bags.

13. The device defined in claim 12, and further including:
    (a) a vehicle seat, said vehicle seat including:
       i. a hollow seat back portion,
    (b) a seat back covering at least a portion of said hollow portion; and
    (c) said inflatable means being mounted in said hollow portion of said vehicle seat and being covered by said seat back.

14. A safety device for occupants of vehicles, including:
    (a) inflatable means for protecting the occupants of said vehicle;
    (b) a compressed gas supply connected to said inflatable means;
    (c) at least one relief air scoop communicating between the exterior of said vehicle and the interior of said vehicle; and
    (d) means to control connected to said compressed gas supply and said exhaust relief air scoop.

15. The device defined in claim 14, and including:
    (a) at least one seat header interposed between said compressed gas supply and said inflatable means.

16. The device defined in claim 15, wherein said inflatable means include at least one inflatable airbag connected to said seat header.

17. The device defined in claim 16, and further including:
    (a) an exhaust relief valve connected to said exhaust relief air scoop and operated by said means to control; and
    (b) an inlet valve positioned downstream of said compressed gas supply and operated by said means to control.

18. The device defined in claim 17, and including at least one venturi interposed in said manifold between said inlet valve and said seat header.

19. The device defined in claim 18, wherein said inflatable means include passenger airbags and pilot/crew airbags.

20. The device defined in claim 19, wherein said means to control include:
    (a) a power supply,
    (b) a master on/off switch connected to said power switch; and
    (c) an altitude operated switch connected to said master on/off switch.

21. The device defined in claim 20, wherein said means to control further include:
    (a) a passenger system on/off switch connected at its input to said altitude operated switch, and at its output to said inlet valve, said header valve and said gas supply valve.

22. The device defined in claim 21, wherein said means to control further include a pilot-crew on/off switch connected at its input to said altitude operated switch, and at its output to a pilot/crew header valve.

23. The device defined in claim 22, wherein said means to control further include:
    (a) an automatic system actuator operable upon impact connected to said altitude operated switch, said inlet valve, said gas supply valve, said passenger header valve, and said pilot/crew header valve to operate said valves to first open said exhaust relief scoops, next open said gas supply valve, and then operate said header valves to inflate said passenger and said pilot/crew airbags.

24. The device defined in claim 23, and further including:
    (a) a vehicle seat, said vehicle seat including:
       i. a hollow seat back portion,
    (b) a seat back covering at least a portion of said hollow portion; and
    (c) said inflatable means being mounted in said hollow portion of said vehicle seat and being covered by said seat back.

* * * * *